Patented July 14, 1931

1,814,473

UNITED STATES PATENT OFFICE

ERNST ALFRED HAUSER, OF FRANKFORT-ON-THE-MAIN, GERMANY, AND REGINALD HARRY WATTS, OF HERNE BAY, ENGLAND, ASSIGNORS TO DEWEY AND ALMY CHEMICAL COMPANY, OF CAMBRIDGE, MASSACHUSETTS, A CORPORATION OF MASSACHUSETTS

COLLOIDAL DISPERSION OF PLASTIC COMPOSITIONS SUCH AS CAOUTCHOUC, GUTTA PERCHA, BALATA, ARTIFICIAL RUBBER (FACTIS), AND THE LIKE

No Drawing. Original application filed October 2, 1930, Serial No. 486,048, and in Germany December 22, 1928. Divided and this application filed Aprl 15, 1931. Serial No. 530,444.

The present invention relates to a new substance, namely a colloidal dispersion of plastic compositions such as caoutchouc, guttapercha, balata, artificial rubber (factis) and the like, that is to say, latex and the like, which is transformed into the thixotropic condition. The thixotropic property enables the treatment of these dispersions, for a great variety of purposes, to be very substantially facilitated, as will hereinafter be described with reference to a thixotropic latex mixture.

The term thixotropic is applied to the phenomenon exhibited by colloids of forming, with their dispersive media, a reversible gel, sometimes elastic which can be transformed into a liquid condition, namely that of a sol, by the effect of motion, stirring, agitation, pressure and the like, the dispersions liquefied in this manner when left at rest reverting to the state of a gel. This operation can be repeated at convenience, or at least for a considerable number of times.

Substances exhibiting thixotropic properties are found in nature, but can also be prepared in the laboratory. Bentonite, a colloidal American clay, forms an example of a natural colloid with thixotropic properties. Among the artificially prepared thixotropic gels, mention may be made of dialyzed ferric oxide sol, which can be converted into a gel by means of a few millimolecules of an electrolyte solution, such as sodium chloride or sulphate.

In the same way as the time required for the formation of the gel condition from that of sol can be shortened or prolonged within wide limits by the action of various additions in the case of ferric oxide sol, or of an organic thixotropic sol like benzoyl-cystine, so also can the effect observed in the case of natural colloids be varied within a wide range. If, for example, native bentonite be dialyzed after having been stirred up to a dispersed condition with water, it loses the faculty of forming a thixotropic gel, but if electrolytes are then added to it the formation and especially the consistency of the thixotropic gel can, as already mentioned, be varied within wide limits.

It has long been known that, with water as the dispersive medium, colloidal dispersions of plastic compositions give rise to difficulties, in many respects, during their further treatment, as compared, for example, with colloidal solutions of the same substances in organic solvents—in short, with organosols. This phenomenon is observed more particularly when the capacity of latex for being worked as the natural aqueous dispersion of caoutchouc—is compared with that of a solution of rubber in organic solvents. If, for example, any convenient mould be dipped in a latex containing an average proportion of 35% of rubber, it will be found that, after the mould has been withdrawn from the bath, and the adherent film dried, the residual film of rubber is substantially thinner than if the mould had been dipped in a solution of only 5% rubber in benzine. The reason is to be found in the low viscosity of the aqueous dispersion as compared with that of the organic solution.

The transformation of latex, or latex mixture, into the thixotropic condition not only obviates this inconvenience, but also enables substantially more highly concentrated dispersions to be employed at the outset. Although more highly concentrated non-thixotropic latex also enables thicker layers to be deposited on the dipping mould, it nevertheless presents the disadvantage that the effect of the heat in drying is to increase the fluidity of the layers again, so that some of the material runs down off the mould and leaves irregularities on the surface. If, on the other hand, the concentrated latex mixture is thixotropic, the pressure exerted in the operation of dipping, liquefies the mass (which is of gelatinous consistency) to a sufficient extent to enable a satisfactory dipping to be effected at the start. If the mould be then left at rest for a short time, the composition will revert to the condition of gel and, on the mould being taken out, will leave deposited thereon a comparatively stout layer which has set to a gel, which remains adherent, without running, even in the warm, no matter in which directions the mould is turned about.

Whereas in order to produce, by dipping, a body of the thickness required, for example in the case of gloves, cycle handle grips and the like, it was formerly necessary to carry out a number of dipping operations, with intermediate drying operations in each case, a single dipping now suffices to produce an article with walls up to several millimetres in thickness. Moreover, the value of such a latex mixture is not restricted to the dipping process, but is equally applicable in the case of coating fabrics by spreading, since, in this case, the act of spreading liquefies the composition to enable it to flow smoothly under the knife, whilst, on the other hand, once it is applied on the material, it reverts at once to the state of gel, and consequently, even when the thickness of the layers is considerable, does not give rise to any irregularities through running.

A number of so-called thickening agents have already been proposed for spreading and dipping in order to counteract the natural fluidity of the latex and produce a viscous liquid. For this purpose, use has been made of various vegetable mucilages and thickeners, such as tragacanth, Iceland moss and the like, and also of formaldehyde. These methods, however, are attended with the defect that the viscosity of a latex of a given composition cannot be diminished and increased at will and that, in consequence the concentration of the latex has to be maintained within narrow limits. In contrast thereto, the thixotropic gel offers the advantage that its fluidity can at once be restored, and vice versa, wherever necessary without any special treatment.

In addition to the spreading process hereinbefore described, the thixotropic latex can also be used, for example, for pouring, or in conjunction with a spraying process, since, in these cases also, the latex mixture remains fluid while the work is being performed, and then reverts to the gel condition when left at rest.

The employment of thixotropic latex also offers special advantages in the production of articles by casting, which process is, for the first time rendered at all practicable by means of such a latex. By the establishment of a condition of high fluidity, it is possible, in all processes, to prevent the inclusion of air bubbles, a defect which very readily occurs when artificially thickened latices are employed.

In the preparation of mixtures, the advantage of the preliminary treatment is again manifested. In the sol or fluid state, it is easy to produce a homogeneous mixture, and then to store it for any period without fear of the filling ingredients, or other additions, separating out, this being prevented by the "solidification" or gelling which occurs. If it be subsequently desired to vary the proportions of the mixture, or add other substances thereto, all that is necessary is to restore the fluid condition by stirring, and the like. It has been found, as a valuable property, that latex and mixtures thereof, in the thixotropic condition, can be more easily dehydrated, presumably because the nature of the combination with the water has been modified.

Colloidal dispersions of rubber either artificial or natural, such as latex, can be brought into the thixotropic condition by arranging for the presence of thixotropic colloids. This can be effected in various ways; for example by adding thixotropic colloids, such as native bentonite, to the latex itself, the only point to be considered being that the final concentration, and also the electrolytes present in the latex, do not adversely affect the thixotropic condition. Moreover, the latex may also be mixed with suitable non-thixotropic colloids and the resulting mixture then transformed into the thixotropic condition. For example, latex is mixed with dialyzed bentonite or china clay and the like, and this mixture is then brought into the thixotropic condition by the addition of an electrolyte such as potassium chloride, sodium sulphate, or the like. This method is particularly suitable, as enabling any desired degree of the thixotropic effect to be obtained. A third possibility consists in bringing into the thixotropic condition the colloids occurring naturally in the latex. Thus, for example, latex can be brought into the thixotropic condition by the addition of lithium sulphate, the change being presumably attributable to a corresponding modification of the glucosides present in the latex.

The invention relates, not only to caoutchouc dispersions, but also to others, such as artificial rubber, balata and guttapercha dispersions. The resulting compositions can be employed, with advantage, for the most diverse purposes. Here again, the particular advantage consists in that, for example in the sol or fluid state they can be caused to adapt themselves well to moulds of complicated contour and be afterwards transformed into the condition of gel, which assures the retention of the contours.

The invention is, of course, not restricted to pure dispersions, but is intended to include also mixtures of such dispersions with, for example, filling, colouring and vulcanizing agent.

*Examples*

1. To 100 cc. of 35% latex are added 3.5 grms. of bentonite in the form of a 12% aqueous suspension, whereupon a thixotropic latex is formed.

2. 100 cc. of a 35% latex are treated with 3 grms. of bentonite (in the form of a dialyzed bentonite suspension) and 15 cc. of a 10% solution of caustic potash. By this means the mixture, comprising the bentonite present in the latex, is rendered thixotropic.

This is a division of application Serial No. 486,048, filed October 2, 1930.

We claim:

1. Method of forming rubber casts comprising immersion of a mold-form in a thixotropic aqueous dispersion of rubber, allowing the said dispersion to assume the gel condition in contact with said mold-form surface, withdrawing the mold-form and an adherent layer of thixotropic gel from the surrounding dispersion, and thereafter removing the aqueous dispersion medium.

2. Method of forming rubber casts comprising immersion of a mold-form in a thixotropic aqueous dispersion of rubber in the gel condition, thereby translating the dispersion in propinquity to the mold-form into the sol condition, then maintaining the mold-form and the contiguous dispersion relatively at rest until the dispersion re-assumes a thixotropic gel condition, then withdrawing the mold-form and an attached layer of gel dispersion from the surrounding dispersion and thereafter removing the aqueous dispersion medium.

In testimony whereof we affix our signatures.

ERNST ALFRED HAUSER.
REGINALD H. WATTS.